No. 721,471. PATENTED FEB. 24, 1903.
R. SCHLUMBERGER.
HOT AIR FURNACE.
APPLICATION FILED MAY 20, 1902.
NO MODEL.
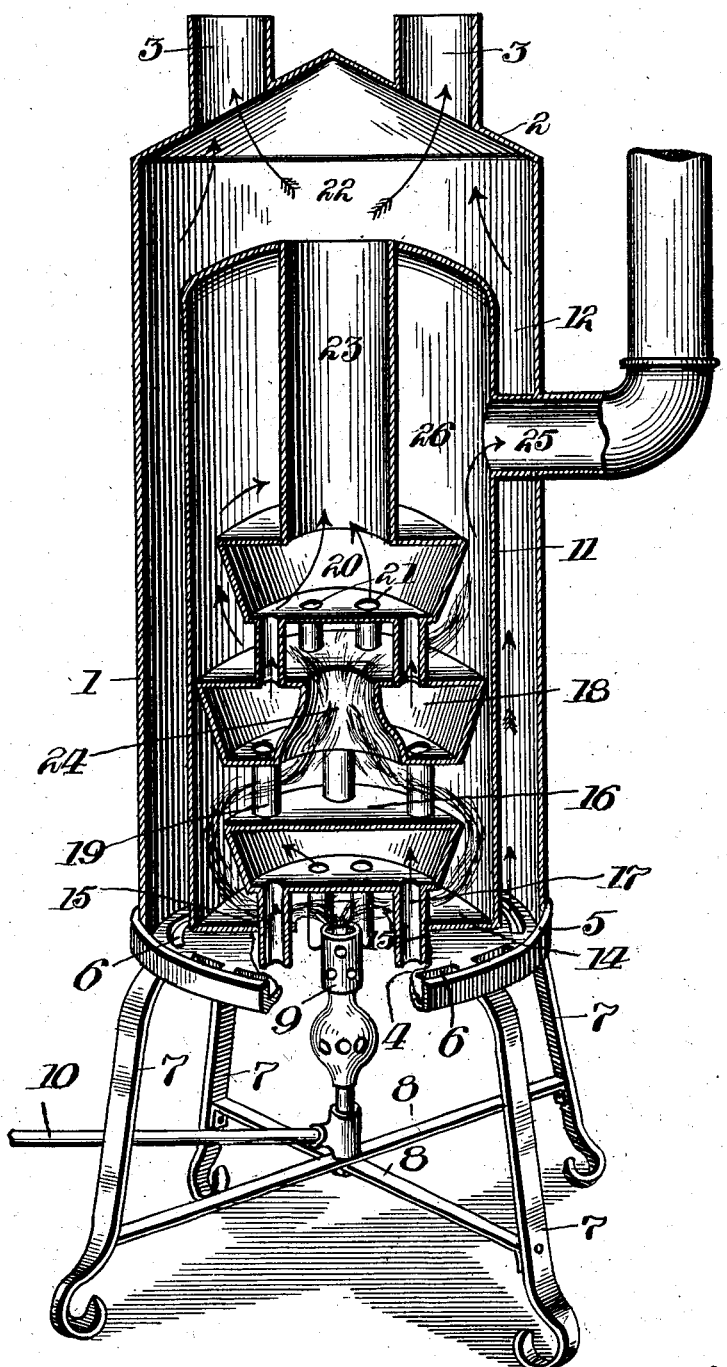
Witnesses:
Inventor
Robert Schlumberger,
By
Attorneys.

UNITED STATES PATENT OFFICE.

ROBERT SCHLUMBERGER, OF ALLEGHENY, PENNSYLVANIA.

HOT-AIR FURNACE.

SPECIFICATION forming part of Letters Patent No. 721,471, dated February 24, 1903.

Application filed May 20, 1902. Serial No. 108,212. (No model.)

*To all whom it may concern:*

Be it known that I, ROBERT SCHLUMBERGER, a citizen of the United States of America, residing at Allegheny, in the county of Allegheny and State of Pennsylvania, have invented certain new and useful Improvements in Hot-Air Furnaces, of which the following is a specification, reference being had therein to the accompanying drawing.

This invention relates to certain new and useful improvements in hot-air furnaces, and is particularly adapted for use in connection with gas as a fuel for producing the heated air.

The invention has for its object to construct a furnace of this character which may be used not only for the heating of buildings as an entirety, but also conveniently used for the heating of single rooms, hallways, and the like; and another object of the invention is to so construct the furnace that a greater heating efficiency may be created within a neat and compact structure than has heretofore been possible.

A further object of the invention is to provide means for passing the air to be heated directly through the heater, whereby the same will be rapidly heated, and also to provide means for admitting air to the space around the heater and heat this air by the heat thrown off by the heater, so as to increase the efficiency of the device.

Still further objects of the invention are to provide means whereby all products of combustion are conducted to the exit-flue without danger of being discharged through the outlets for the hot air and to provide means whereby a series of air-heating pans disposed one above the other within the heater receive the full benefit of the flame from the burner direct, whereby the best possible results are obtained.

Briefly described, my invention comprises a shell or casing usually made cylindrical and provided at its upper end with one or more outlets for the hot air. This shell or casing is supported on an annulus having suitable supporting-legs, the annulus and legs forming the supporting-stand for the furnace. An inner shell or casing is also supported on the ring or annulus, and the latter is provided between the inner and outer shells or casings with openings forming air-passages, through which cold air enters into the space between the two casings and is heated therein, commingling with the heated air discharged from the interior of the inner casing. A heater of especial construction is arranged within the inner casings and embodies a series of heating-chambers disposed one above the other and so arranged that the casing of each chamber is subjected to the direct action of the flames from the burner upon the shell or casing of the chamber; but the flame is excluded from the interior of the chambers. Means is provided for admitting air to the lowermost chamber and passing the same successively through the chambers, whereby it is highly heated before being discharged into the air-space at the top of the outer casing or shell and from thence discharged into the room or building. All of this construction will be hereinafter more specifically described and then particularly pointed out in the claims, and in describing the invention in detail reference is had to the accompanying drawing, forming a part of this specification and wherein like numerals of reference will be employed to designate like parts throughout the drawing, which shows a central vertical section of my improved heater, the annulus or ring being in perspective and partly broken away, with the casings of the heating-chambers also in perspective.

To put my invention into practice, I provide a casing or shell 1, preferably made cylindrical in form, though not necessarily so, this shell or casing being provided with a top 2, which in the present illustration is shown substantially conical in form, and this top 2 has one or more hot-air outlets 3. The shell or casing 1 is mounted on the supporting-stand, comprising an annulus 4, having the upwardly-extending flange 5 around its outer edge and provided adjacent to said flange with a series of cold-air inlets 6, arranged circumferentially in the annulus or ring, so that the cold air may freely enter the casing 1 entirely around the same at its lower end. This annulus or ring 4 is mounted upon suitable supporting-legs 7, which have braces 8, crossing at right angles, as shown, and forming a support for the base of the burner 9, with which the supply-line 10 is connected. The burner is suitably connected to the supporting-braces 8 in any desirable manner in order that the same may be held against accidental displacement. The burner 9 may be of any approved form of combined burner and air-mixer.

The annulus or ring 4 is constructed of a width sufficient to receive and support the inner casing or shell 11, which is of a diameter considerably less than the diameter of the outer shell or casing, so that an air-space 12 of considerable capacity will be formed between the two casings. The inner shell or casing has an inwardly-extending flange 14 at its lower end, which is provided near its outer edge with circumferentially-arranged openings 15. Mounted within this shell or casing 11 is the heater, which consists of a series of heating pans or shells each having a heating-chamber and disposed one above the other. In the present illustration I have shown three of these shells or pans, which is sufficient to illustrate the principle of the invention, though two, three, or more may be employed. These heating shells or pans are each of the same general shape, being somewhat in the form of a frustrated cone, and they are disposed within the shell or casing 11 one above the other, as shown. The lower shell or heating-pan 16 and the upper shell or heating-pan 20 are substantially of the same size and are considerably less at their greatest diameter than the diameter of the central heating shell or pan 18, interposed between the pans or shells 16 20. The central heating shell or pan 20 is of a diameter equal to the interior diameter of the shell or casing 11, so as to form a neat fit with the inner wall of said casing 11 for a purpose as will presently appear. The lowermost shell or pan 16 carries air-inlet tubes 17, which extend through the openings 15 in the flanges 14 and project a considerable distance below the said flange 14, the lower ends of these air-tubes being below the discharge end of the burner 9, so that the flames from the burner will not be drawn into the tubes. The base of the pan 16 is, however, some distance above the flange 14 in order that when the flames strike the bottom of said pan or shell 16 they will be deflected and spread entirely around the pan. The central pan or shell 18, as stated, is of a diameter to fill the interior of the casing 11, and this central pan is provided with a central flue 24, establishing communication between the space above the pan 18 and the space below the said pan or shell. This central pan or shell 18 also carries air-tubes 19, establishing communication between the chamber in said pan or shell and the chamber in the pan or shell 16. The uppermost pan or shell 20 carries air-tubes 21, establishing communication between the chamber or space in said shell or pan and the chamber or space in the pan or shell 18, and the chamber or space in the pan 20 is in communication with the hot-air space 22 within the top of the outer casing 1 by a central hot-air flue 23. I preferably construct these pans or shells in which the air is heated each with the depending air-tubes and construct the central pan or shell and the lowermost one with openings in the top plate to receive the depending tubes. The top plate of the uppermost shell or pan is provided with the opening to receive the hot-air tube 23.

An exit flue or chimney extends through the outer casing 1 and communicates with the interior of the casing 11 at a suitable point with the chamber 26 and carries off the products of combustion.

By reason of the draft being shut off along the inner wall of the casing 11 by the top plate of the heating shell or pan 18 contacting with said wall the draft from the exit-flue 25 will be between the top heating shell or pan 20 and the central heating pan or shell 18 through the central flue of said shell or pan, the flame being drawn in between the central pan or shell 18 and the lowermost pan or shell 16, as shown. This diverting of a direct natural draft up the inner wall of the casing 11 to the exit-flue 25 causes all three of the heating shells or pans embodied in the heater to be subjected to the direct action of the flames, and thereby be subjected to much greater heat than would otherwise be the case, causing the same to become heated to a much greater extent and largely increasing the heating ability of the device. Owing to the fact that the pans or shells become highly heated, owing to the fact that they are subjected to the direct action of the flames, the shell 11 will consequently throw off considerable heat, which will heat the air that passes into the space 12 through the air-inlets 6, this heated air rising within the space 12 to the space 22 at the top of the outer casing and being discharged with the heated air which is delivered into said space 22 through the hot-air flue 23. I also desire to call attention to the fact that the air-tubes 17 19 21 are disposed so as not to be in line with each other, and the air is thus caused to travel more slowly through the successive pans or heating-chambers, so that the same will be heated to a greater extent before it is discharged into the chamber 22 and from thence through the outlets 3 into the room or building.

Having fully described my invention, what I claim as new, and desire to secure by Letters Patent, is—

1. A hot-air furnace comprising a supporting-stand having an annulus or ring provided with openings, a casing or shell supported on said annulus and provided at its top with hot-air outlets, an inner casing or shell supported on the ring with an inwardly-extending flange at its lower end provided with openings, and a heater within the inner casing comprising a series of heating shells or pans disposed one above the other with the bottom of each pan in communication with the bottom of the adjacent pan or shell, substantially as described.

2. In a hot-air furnace, a supporting annulus or ring provided with cold-air inlets, an outer shell or casing supported on said ring and provided at its upper end with hot-air outlets, an inner shell or casing supported on the annulus, a heater comprising a series of heating-chambers disposed one above the other and in communication the one with the other, a burner arranged beneath the lowermost chamber, and a hot-air flue establishing communication between the upper chamber of the heater and the hot-air space within the outer shell or casing, substantially as described.

3. In a hot-air furnace, an outer shell or casing provided with hot-air outlets, an inner shell communicating at its upper end with a space at the top of the outer shell, a supporting-stand having an annulus on which the outer and inner casings rest, said annulus having openings to admit air to the space between the casings, an exit-flue communicating with the inner shell or casing, and a heater comprising a series of heating-chambers disposed one above the other and in communication with each other, the shell or casing of one of the said chambers engaging the inner wall of the inner casing, as and for the purpose described.

4. In a hot-air furnace, the combination with an outer shell or casing having hot-air outlets at its top, an inner shell or casing, a supporting-annulus having cold-air inlets for the admission of air to the space between the casings, a heater comprising a series of heating shells or pans disposed one above the other with one of said pans connecting with the inner wall of the inner casing and having a central flue for the draft, the draft being around and over all said heating pans or shells, and a burner supported beneath the lowermost heating shell or pan, substantially as described.

5. In a hot-air furnace, the combination with an inner and outer casing, and a common support for said casings, said support provided with circumferentially-arranged openings to admit air to the space between the casings, of a heater comprising a series of heating shells or pans disposed one above the other, the chambers of said shells or pans in communication, one of said shells or pans being of greater diameter than the others and engaging the inner wall of the inner casing, and a burner supported beneath the lowermost heating shell or pan, substantially as described.

In testimony whereof I affix my signature in the presence of two witnesses.

ROBERT SCHLUMBERGER.

Witnesses:
JOHN NOLAND,
E. E. POTTER.